US009441305B2

(12) United States Patent
Lawless et al.

(10) Patent No.: US 9,441,305 B2
(45) Date of Patent: Sep. 13, 2016

(54) COMPOSITION AND METHOD FOR INHIBITING CORROSION

(71) Applicant: The Boeing Company, Chicago, IL (US)

(72) Inventors: Lawrence M. Lawless, Chesterfield, MO (US); Bruce M. Griffin, St. Louis, MO (US); Craig W. Scott, Saint Charles, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/146,768

(22) Filed: Jan. 3, 2014

(65) Prior Publication Data

US 2015/0191831 A1    Jul. 9, 2015

(51) Int. Cl.
| B32B 15/00 | (2006.01) |
| C23F 11/18 | (2006.01) |
| B05D 1/28 | (2006.01) |
| B05D 3/00 | (2006.01) |
| B05D 3/12 | (2006.01) |
| C25D 5/48 | (2006.01) |
| C09D 5/08 | (2006.01) |
| C23C 18/16 | (2006.01) |
| C09D 7/12 | (2006.01) |

(52) U.S. Cl.
CPC .............. *C23F 11/18* (2013.01); *B05D 1/28* (2013.01); *B05D 3/007* (2013.01); *B05D 3/12* (2013.01); *C09D 5/08* (2013.01); *C23C 18/1689* (2013.01); *C25D 5/48* (2013.01); *C09D 5/082* (2013.01); *C09D 7/1216* (2013.01)

(58) Field of Classification Search
CPC .......... B05D 1/29; B05D 3/007; B05D 3/12; C09D 5/08; C09D 5/082; C09D 7/1216; C23C 18/1689; C23F 11/18; C25D 5/48; B32B 5/00; B32B 5/16; B32B 15/00
USPC .......................................... 106/14.05, 14.44
See application file for complete search history.

(56) References Cited

U.S. PATENT DOCUMENTS

| 6,777,238 | B1 | 8/2004 | Hall et al. |
| 9,297,068 | B2* | 3/2016 | Cavanaugh Pingree ................. C23C 16/042 |
| 2004/0011433 | A1 | 1/2004 | Shiozaki et al. |
| 2006/0040124 | A1 | 2/2006 | Oshimi et al. |
| 2008/0279756 | A1 | 11/2008 | Zhamu et al. |
| 2009/0014691 | A1* | 1/2009 | Kint ....................... B82Y 10/00 252/500 |
| 2010/0140792 | A1* | 6/2010 | Haddon ................ B82Y 30/00 257/713 |
| 2011/0210282 | A1* | 9/2011 | Foley .................... 252/62.51 R |
| 2013/0171517 | A1 | 7/2013 | He et al. |

FOREIGN PATENT DOCUMENTS

| EP | 2371909 A1 * | 10/2011 | |
| EP | 2570462 A1 * | 3/2013 | ............. C09D 11/00 |
| WO | WO 2012/168941 A1 * | 12/2012 | |
| WO | WO 2014/063114 | 4/2014 | |
| WO | WO 2014/137352 | 9/2014 | |
| WO | WO 2014/137352 A1 * | 9/2014 | ............... C09D 5/08 |

OTHER PUBLICATIONS

Derwent-Acc-No. 2013-P22022, abstract of Chinese Patent Specification No. CN 103031039 A (Apr. 2013).*
Derwent-Acc-No. 2013-T25779, abstract of Chinese Patent Specification No. CN 103194146 A (Jul. 2013).*
Jasper, Joseph; "The Surface Tension of Pure Liquid Compounds", J. Phys. Chem. Ref. Data, vol. 1, No. 4. 1972 (pp. 841-1009).*
HM-707 Fluorescent Penetrant, Sherwin Incorporated.
Asoh et al., "Conditions for Fabrication of Ideally Ordered Anodic Porous Alumina Using Pretextured Al," *J. Electrochem. Soc.*, col. 148, iss. 4 (2001).
International Search Report and Written Opinion, PCT/US2014/071771 (2015).

* cited by examiner

*Primary Examiner* — Anthony J Green
(74) *Attorney, Agent, or Firm* — Walters & Wasylyna LLC

(57) ABSTRACT

A corrosion inhibiting composition including a liquid carrier having a surface tension of at most about 35 dynes/cm and an electrically conductive nanomaterial dispersed in the carrier.

11 Claims, 4 Drawing Sheets

COMPOSITION AND METHOD FOR INHIBITING CORROSION

FIELD

This application relates to corrosion inhibition and, more particularly, to compositions and methods for inhibiting corrosion of plated structures.

BACKGROUND

Various materials, such as metals, are plated to enhance performance properties. For example, steel is commonly plated with chromium (chrome), such as hexavalent chromium or trivalent chromium, to increase hardness, enhance wear-resistance and/or improve lubricity. Chrome plating is also used for purely aesthetic purposes. Therefore, chrome plated structures can be found in various industrial applications, such as in the aerospace and automotive industries.

Chrome plating has a cracked microstructure comprised of a fine lattice of microcracks having no definite or repeating pattern. These microcracks may facilitate rapid corrosion of the underlying substrate. Therefore, various techniques have been developed in an attempt to inhibit corrosion of chrome-plated structures.

As one example, additional plating layers, such as a layer of nickel plating, are used to improve the corrosion resistance of chrome-plated structures. However, additional plating processes are capital intensive, time consuming, and generate additional byproducts that require special handling and disposal.

As another example, chrome-plated structures are impregnated with a polymer to improve corrosion resistance. Specifically, styrene monomer resin is used to impregnate chrome-plated structures using a vacuum impregnation process, followed by an alkaline cleaning step and a resin cure step. However, polymer impregnation is very capital intensive, messy, exacting and time consuming.

As yet another example, chrome-plated structures are painted with a hexavalent chromium-based primer. After a short dwell time, excess primer is wiped away, requiring particular attention to materials handling and disposal.

Accordingly, those skilled in the art continue with research and development efforts in the field of corrosion inhibition.

SUMMARY

In one aspect, the disclosed corrosion inhibiting composition may include a liquid carrier having a surface tension of at most about 35 dynes/cm and an electrically conductive nanomaterial dispersed in the carrier.

In another aspect, disclosed is a method for manufacturing a corrosion inhibiting composition. The manufacturing method may include the steps of (1) providing an electrically conductive nanomaterial; and (2) dispersing the electrically conductive nanomaterial in a liquid carrier, wherein the liquid carrier has a surface tension of at most about 35 dynes/cm. Optionally, the dispersion may be maintained with agitation.

In another aspect, disclosed is a method for inhibiting corrosion of a material. The method may include the step of applying to the material a composition including a liquid carrier having a surface tension of at most about 35 dynes/ cm and an electrically conductive nanomaterial dispersed in the carrier.

In yet another aspect, the disclosed method for inhibiting corrosion of a material, such as plating on a substrate, may include the steps of (1) applying to the material a composition including a liquid carrier having a surface tension of at most about 35 dynes/cm and an electrically conductive nanomaterial dispersed in the carrier; (2) allowing the composition to dwell on the material; (3) removing excess quantities of the composition from the material; and (4) drying the composition.

Other aspects of the disclosed composition and method for inhibiting corrosion will become apparent from the following detailed description, the accompanying drawings and the appended claims.

DETAILED DESCRIPTION

It has now been discovered that the introduction of an electrically conductive nanomaterial into a microcrack, such as the microcracks in chrome plating, may inhibit corrosion. Without being limited to any particular theory, the electrically conductive nanomaterial may form an electrical circuit array within the microcracks of the plating layer, thereby dispersing any localized electrical nodes that may facilitate electrochemical corrosion reactions.

Figure 1:
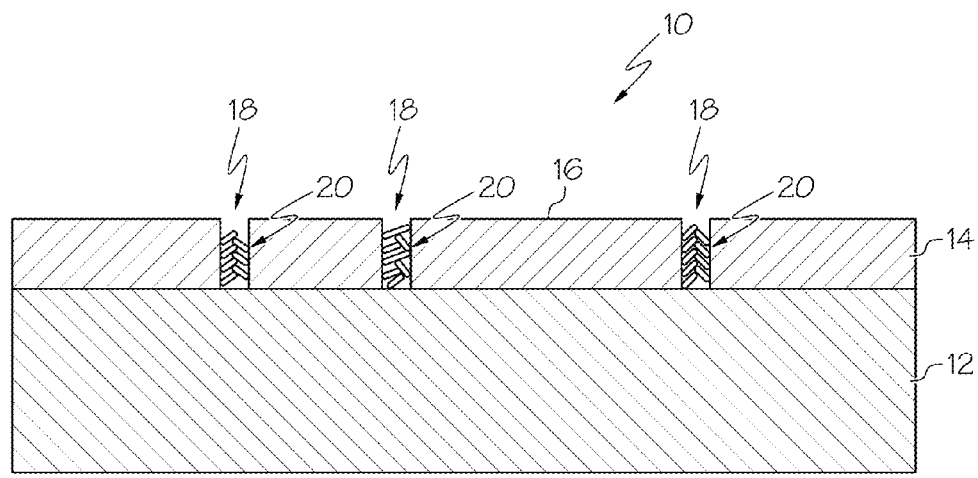
FIG. 1 is a schematic cross-sectional view of a plated structure treated with the disclosed corrosion inhibiting composition.

FIG. 1 illustrates a plated structure 10 that has been treated with the disclosed corrosion inhibiting composition in accordance with one aspect of the present disclosure. The plated structure 10 may include a substrate 12 and plating 14 on the substrate 12. The plating 14 may define the external surface 16 of the plated structure 10. Additionally, the plating 14 may define microcracks 18.

The substrate 12 may be any substrate capable of supporting the plating 14. As one general, non-limiting example, the substrate 12 may be a metal or metal alloy. As one specific, non-limiting example, the substrate 12 may be steel.

The plating 14 may be a surface treatment layer applied to the substrate 12 using an electrochemical or electroless plating process. As one specific, non-limiting example, the plating 14 may be chrome plating (e.g., the plating 14 may comprise chromium). As another specific, non-limiting example, the plating 14 may be nickel plating (e.g., the plating 14 may comprise nickel).

The electrically conductive nanomaterial 20 may be positioned in the microcracks 18 of the plating 14 after the plated structure 10 has been treated with the disclosed corrosion inhibiting composition, as is discussed in greater detail herein. The electrically conductive nanomaterial 20 received in the microcracks 18 of the plating 14 may inhibit corrosion of the underlying substrate 12.

The disclosed corrosion inhibiting composition may include a carrier and an electrically conductive nanomaterial. The electrically conductive nanomaterial may be dispersed in the carrier, such as by agitating a mixture of the carrier and the electrically conductive nanomaterial. Additional components, such as dispersants, may be included in the corrosion inhibiting composition without departing from the scope of the present disclosure.

The carrier and the electrically conductive nanomaterial may be mixed at various weight ratios, while still being capable of delivering the electrically conductive nanomaterial 20 into the microcracks 18 of the plating 14 of the plated structure 10. The concentration of electrically conductive nanomaterial should be sufficiently high to provide an effective amount of the electrically conductive nanomaterial within the microcracks 18, but should not be so high as to interfere with the flow properties of the corrosion inhibiting composition. In one implementation, the weight ratio of the carrier to the electrically conductive nanomaterial may range from about 120:1 to about 30:1. In another implementation, the weight ratio of the carrier to the electrically conductive nanomaterial may range from about 100:1 to about 50:1. In yet another implementation, the weight ratio of the carrier to the electrically conductive nanomaterial may range from about 80:1 to about 60:1.

The carrier may be a liquid and may have a relatively low surface tension to allow the carrier to penetrate microcracks, such as the microcracks in chrome plating. In one realization, the carrier may have a surface tension of at most about 35 dynes/cm. In another realization, the carrier may have a surface tension of at most about 30 dynes/cm. In another realization, the carrier may have a surface tension of at most about 25 dynes/cm. In yet another realization, the carrier may have a surface tension of at most about 20 dynes/cm.

Various carrier compositions may be employed to achieve the desired surface tension. The carrier may include a single liquid component or a mixture of liquid components to achieve the desired surface tension. The carrier may be or may include a surfactant, such as ethoxylated alcohol.

As one general, non-limiting example, the carrier may be or may include a liquid penetrant solution, such as a liquid penetrant solution used to perform a dye penetration inspection. As one specific, non-limiting example, the carrier may be or may include HM-707 fluorescent penetrant solution, which is commercially available from Sherwin, Inc., of South Gate, Calif. Those skilled in the art will appreciate that inclusion of a dye in the carrier is optional.

The electrically conductive nanomaterial may include any material or combination of materials that conducts electricity and that has at least one dimension (e.g., width; diameter; thickness) smaller than 1000 nm. In one expression, at least a portion of the electrically conductive nanomaterial has at least one dimension ranging from about 1 to about 500 nanometers. In another expression, at least a portion of the electrically conductive nanomaterial has at least one dimension ranging from about 1 to about 100 nanometers. In yet another expression, at least a portion of the electrically conductive nanomaterial has at least one dimension ranging from about 1 to about 10 nanometers.

Referring again to FIG. 1, those skilled in the art will appreciate that the size of the electrically conductive nanomaterial used in the disclosed corrosion inhibiting composition may be dictated by the size of the microcracks 18 into which the electrically conductive nanomaterial 20 is intended to be introduced. Finer microcracks 18 may require using finer electrically conductive nanomaterial 20.

The composition of the electrically conductive nanomaterial may not be limiting, as various compositions may be used. For example, the electrically conductive nanomaterial may include carbon nanomaterial (e.g., graphene nanomaterial), carbide nanomaterial and the like.

Various nanomaterial structures may be used. For example, the electrically conductive nanomaterial may include nanoplatelets, nanotubes, nanorods, nanowires, nanoparticles, nanopowders, nanofibers, nanofilaments and the like.

Figure 2:
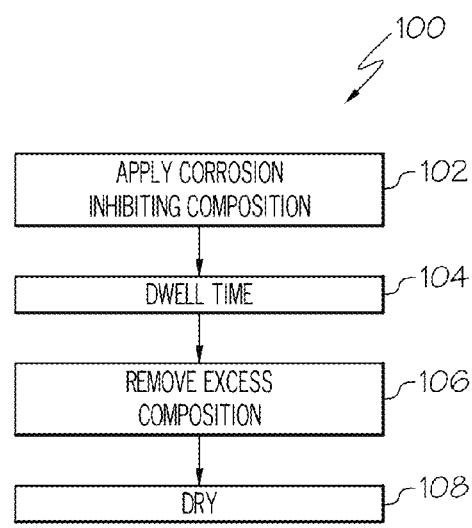
FIG. 2 is a flow chart depicting one aspect of the disclosed method for inhibiting corrosion.

Referring to FIG. 2, also disclosed is a method 100 for inhibiting corrosion of a material. The material may be a plated structure, such as the plated structure 10 shown in FIG. 1, and may include microcracks.

At Block 102, the disclosed corrosion inhibiting composition may be applied to the material. For example, the disclosed corrosion inhibiting composition may be applied to the external surface 16 of the plated structure 10 shown in FIG. 1.

Various techniques may be used to apply the disclosed corrosion inhibiting composition to the material (e.g., a plated structure). As one non-limiting example, the disclosed corrosion inhibiting composition may be brushed (e.g., painted) onto the material. As another non-limiting example, the disclosed corrosion inhibiting composition may be sprayed onto the material. As yet another non-limiting example, the material may be dipped into the disclosed corrosion inhibiting composition.

At Block 104, the disclosed corrosion inhibiting composition may be allowed to dwell on the material. As one non-limiting example, the disclosed corrosion inhibiting composition may dwell on the material for at least 5 minutes. As another non-limiting example, the disclosed corrosion inhibiting composition may dwell on the material for at least 15 minutes. As another non-limiting example, the disclosed corrosion inhibiting composition may dwell on the material for at least 30 minutes. As another non-limiting example, the disclosed corrosion inhibiting composition may dwell on the material for at least 1 hour. As yet another non-limiting example, the disclosed corrosion inhibiting composition may dwell on the material for at least 5 minutes and at most 2 hours.

At Block 106, excess quantities of the disclosed corrosion inhibiting composition may be removed from the material. For example, excess quantities of the disclosed corrosion inhibiting composition may be removed from the external surface 16 of the plated structure 10 shown in FIG. 1. The removal step (Block 106) may be performed after the dwelling step (Block 104), but both removal without dwelling and removal before dwelling are also contemplated.

Various techniques may be used to remove excess quantities of the disclosed corrosion inhibiting composition from the material. As one non-limiting example, excess quantities of the disclosed corrosion inhibiting composition may be wiped away with a clean, dry wipe (e.g., cheesecloth; paper towel; cloth towel; rag). As another non-limiting example, excess quantities of the disclosed corrosion inhibiting composition may be wiped away with a dry wipe followed by another wiping with a moistened (e.g., water moistened; solvent moistened) wipe. As another non-limiting example, excess quantities of the disclosed corrosion inhibiting composition may be wiped away with a moistened wipe. As yet another non-limiting example, excess quantities of the disclosed corrosion inhibiting composition may be washed away (e.g., with a water spray or sponge).

At Block 108, the disclosed corrosion inhibiting composition on the material may be dried. As one non-limiting example, drying may be performed at room temperature for a sufficient amount of time (e.g., 24 hours). As another non-limiting example, drying may be performed at elevated temperatures, such as in an oven.

EXAMPLES

Example 1

Corrosion Inhibiting Composition

A corrosion inhibiting composition was prepared by combining HM-707 fluorescent penetrant solution (from Sherwin, Inc.) and industrial quality graphene nanoplatelets (thickness 2 to 10 nm) at a weight ratio (penetrant solution to graphene nanoplatelets) of 60:1. The mixture was stirred constantly.

Example 2

Salt Fog Testing

Four identical chromium-plated steel panels were obtained for testing. The edges of the panels were not plated and, therefore, were taped.

Panel 1 received no treatment and was set aside as the control.

Panel 2 was brushed (using a paintbrush) with HM-707 fluorescent penetrant solution (from Sherwin, Inc.), but without electrically conductive nanomaterial. After 1 hour of dwell time, Panel 2 was spray washed with tap water at 50 to 100° F. The spray washing pressure was less than 40 psi. Panel 2 was then allowed to dry for 10 minutes at 110° F.

Panel 3 was brushed (using a paintbrush) with the corrosion inhibiting composition of Example 1. After 1 hour of dwell time, Panel 3 was spray washed with tap water at 50 to 100° F. The spray washing pressure was less than 40 psi. Panel 3 was then allowed to dry for 10 minutes at 110° F.

Panel 4 was brushed (using a paintbrush) with the corrosion inhibiting composition of Example 1. After 1 hour of dwell time, Panel 4 was wiped with clean, dry cheesecloth. A second wiping immediately followed with clean cheesecloth moistened with acetone.

Figure 3A:
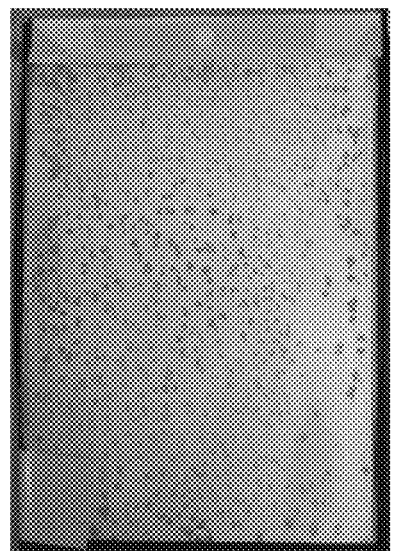
FIGS. 3A-3D are photographs of chrome-plated steel panels subjected to salt spray (fog) testing for 1 hour.
Figure 3B:
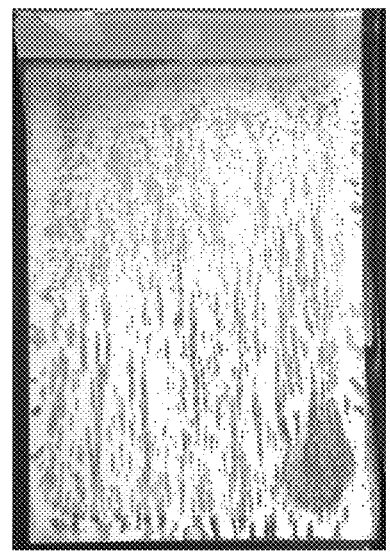
Figure 3C:
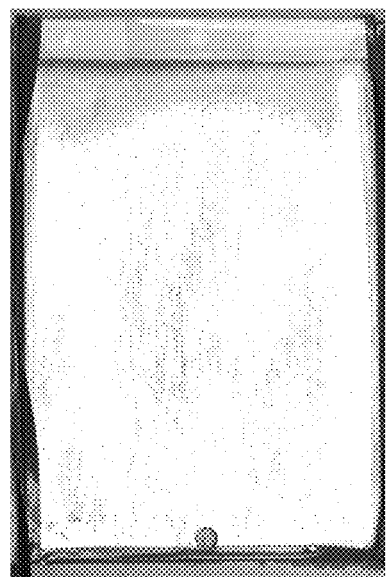
Figure 3D:
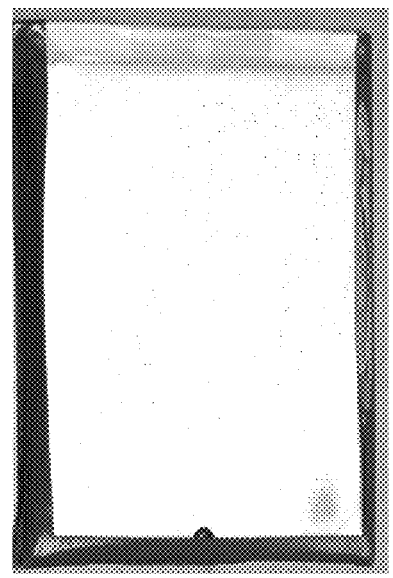
Figure 4A:
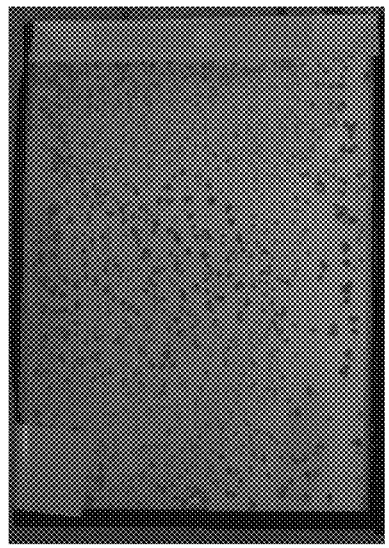
FIGS. 4A-4D are photographs of chrome-plated steel panels subjected to salt spray (fog) testing for 2 hours.
Figure 4B:
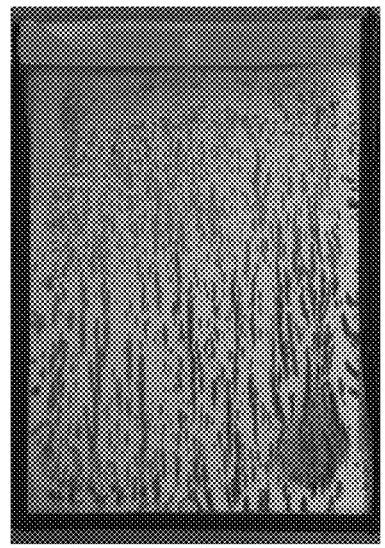
Figure 4C:
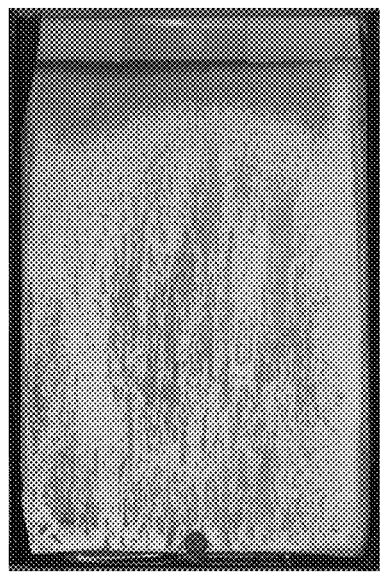
Figure 4D:
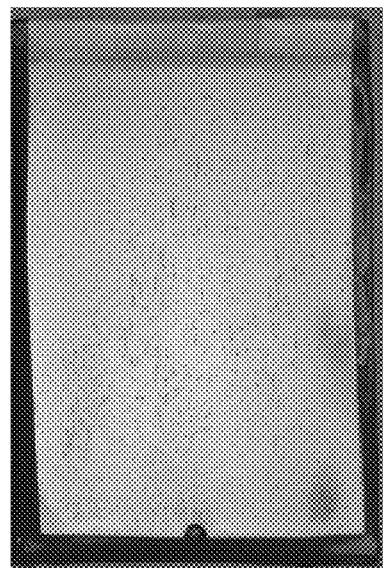
Figure 5A:
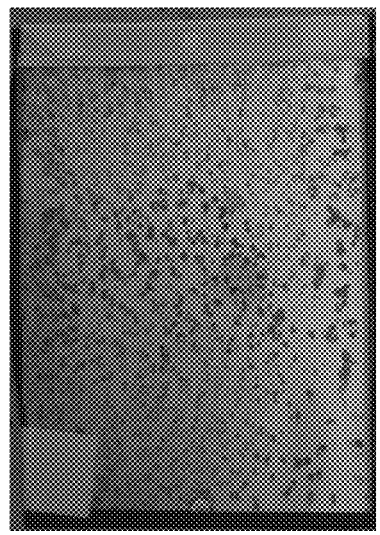
FIGS. 5A-5D are photographs of chrome-plated steel panels subjected to salt spray (fog) testing for 4 hours.
Figure 5B:
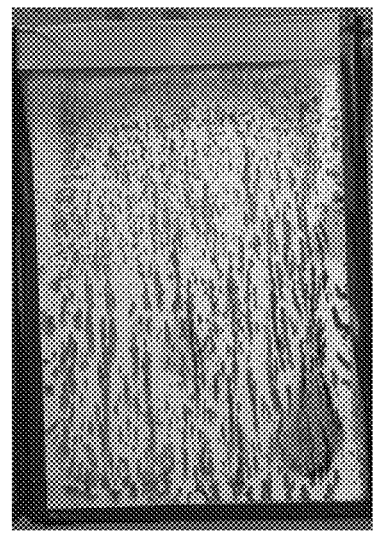
Figure 5C:
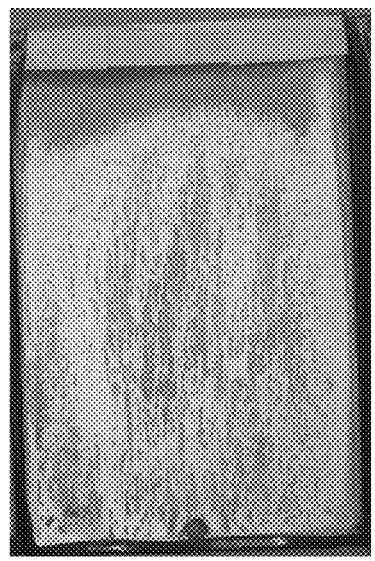
Figure 5D:
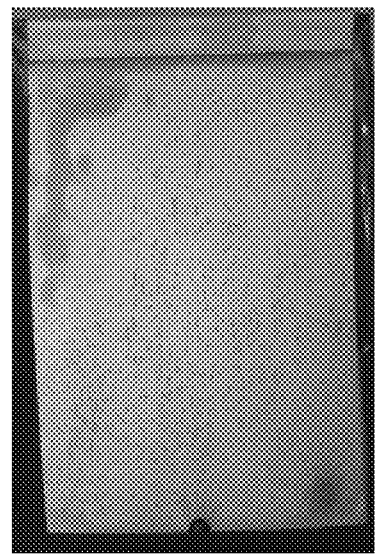

Panels 1-4 were aged for 24 hours before being placed into a neutral salt fog chamber in accordance with ASTM B117. The panels were observed, and photographs were taken, after 1 hour, 2 hours and 4 hours of salt fog exposure. FIGS. 3A, 4A and 5A show Panel 1 after 1 hour, 2 hours and 4 hours, respectively, of salt fog exposure. FIGS. 3B, 4B and 5B show Panel 2 after 1 hour, 2 hours and 4 hours, respectively, of salt fog exposure. FIGS. 3C, 4C and 5C show Panel 3 after 1 hour, 2 hours and 4 hours, respectively, of salt fog exposure. FIGS. 3D, 4D and 5D show Panel 4 after 1 hour, 2 hours and 4 hours, respectively, of salt fog exposure.

Panel 2 (penetrant solution only) showed no corrosion improvement over Panel 1 (the control). However, Panels 3 and 4—the panels treated with the disclosed corrosion inhibiting composition—showed significantly less corrosion than Panels 1 and 2. Between Panels 3 and 4, Panel 4 showed the least amount of corrosion.

Accordingly, the disclosed corrosion inhibiting composition and method for inhibiting corrosion may advantageously inhibit corrosion of plated structures, such as chrome-plated steel structures.

Although various aspects of the disclosed composition and method for inhibiting corrosion have been shown and described, modifications may occur to those skilled in the art upon reading the specification. The present application includes such modifications and is limited only by the scope of the claims.

What is claimed is:

1. A plated structure comprising:
   a metallic substrate;
   chrome plating on said metallic substrate, said chrome plating defining microcracks; and
   a corrosion inhibiting composition applied to said chrome plating, said corrosion inhibiting composition comprising:
      a liquid carrier having a surface tension of at most about 35 dynes/cm; and
      an electrically conductive nanomaterial dispersed in said carrier, said electrically conductive nanomaterial comprising at least one of carbon nanoplatelets, graphene nanoplatelets, carbon nanotubes and carbon nanorods,
   wherein at least a portion of said electrically conductive nanomaterial is received in said microcracks.

2. The plated structure of claim 1 wherein said surface tension is at most about 30 dynes/cm.

3. The plated structure of claim 1 wherein said surface tension is at most about 25 dynes/cm.

4. The plated structure of claim 1 wherein said liquid carrier comprises a dye.

5. The plated structure of claim 1 wherein at least a portion of said electrically conductive nanomaterial has at least one dimension ranging from about 1 to about 500 nanometers.

6. The plated structure of claim 1 wherein at least a portion of said electrically conductive nanomaterial has at least one dimension ranging from about 1 to about 100 nanometers.

7. The plated structure of claim 1 wherein at least a portion of said electrically conductive nanomaterial has at least one dimension ranging from about 1 to about 10 nanometers.

8. The plated structure of claim 1 wherein said electrically conductive nanomaterial comprises graphene nanoplatelets.

9. The plated structure of claim 1 wherein said electrically conductive nanomaterial comprises carbon nanotubes.

10. The plated structure of claim 1 wherein a weight ratio of said liquid carrier to said electrically conductive nanomaterial ranges from about 120:1 to about 30:1.

11. The plated structure of claim 10 wherein said weight ratio ranges from about 80:1 to about 60:1.

* * * * *